United States Patent [19]

Ahmed et al.

[11] Patent Number: 4,625,396
[45] Date of Patent: Dec. 2, 1986

[54] PATTERN FUEL ASSEMBLY LOADING SYSTEM

[75] Inventors: Hassan J. Ahmed, Columbia, S.C.; Kenneth S. Gerkey, Mt. Lebanon Twp., Allegheny County, Pa.; Thomas W. Miller, Butler, Pa.; Mark E. Wylie, Mt. Lebanon Twp., Allegheny County, Pa.

[73] Assignee: Westinghouse Electric Corp., Pittsburgh, Pa.

[21] Appl. No.: 686,960

[22] Filed: Dec. 27, 1984

[51] Int. Cl.$^4$ ............... B23P 21/00; B23Q 15/00; B23Q 17/00; G21C 3/00

[52] U.S. Cl. ............... 29/701; 29/400 N; 29/407; 29/720; 29/723; 29/726; 33/180 R; 73/866.3; 376/463; 414/146; 434/433

[58] Field of Search ............... 29/400 N, 407, 700, 29/701, 720, 723, 726, 727; 33/180 R; 73/432 R; 376/245, 261, 463, 350, 352, 362; 434/433; 414/146, 745, 746, 786; 464/185

[56] References Cited

U.S. PATENT DOCUMENTS

| | | | |
|---|---|---|---|
| 3,440,531 | 4/1969 | Jasorka et al. | 29/407 X |
| 3,611,544 | 10/1971 | Frels et al. | 29/407 |
| 3,667,104 | 6/1972 | Chamillard et al. | 29/407 X |
| 3,706,134 | 12/1972 | Sweeney et al. | 29/407 X |
| 4,104,790 | 8/1978 | Hindricks | 414/745 X |
| 4,127,936 | 12/1978 | Schlup et al. | 29/407 X |
| 4,205,304 | 5/1980 | Moore | 376/245 X |
| 4,326,919 | 4/1982 | Hill | 414/146 X |
| 4,543,711 | 10/1985 | Wada et al. | 29/726 |

Primary Examiner—Howard N. Goldberg
Assistant Examiner—R. S. Wallace

[57] ABSTRACT

An interactive system (10) for facilitating assembly of fuel rods into nuclear fuel assemblies having specific grid location requirements for the fuel rods, includes an operator work station (12) adapted for positioning between a supply of fuel rods and a fuel assembly loading magazine (22). Identifying data with each fuel rod is read by the operator with a manual scanner (24) for input and comparison by a computer (28) with the stored data for the particular fuel assembly to be assembled. The proper grid location for the fuel rod is then displayed on a screen (32) prompting the operator to insert the rod through a prompter/detector apparatus (36) mounted on one end of the magazine. In the preferred embodiment, the apparatus (36) includes a pair of motorized, slotted guide bars (54, 56) controlled by the computer (28) to intersect over the proper grid location for the particular fuel rod type. Sensors (92, 94, 95) are provided on the guide bars (54, 56) for automatically detecting insertion and verifying identification of the fuel rod loaded into the magazine through control logic in the computer (28). Alternate embodiments of the prompter/detector apparatus (110, 140 and 170) are disclosed to provide different degrees of prompting to assist the operator to insert each fuel rod in the proper grid location.

28 Claims, 15 Drawing Figures

PATTERN FUEL ASSEMBLY LOADING SYSTEM

BACKGROUND OF THE INVENTION

The present invention relates generally to an apparatus for facilitating pre-loading of fuel rods into magazines for subsequent loading into fuel assemblies. More particularly, this invention concerns a computer-based, interactive system for assuring proper loading, by operators, of fuel rods of different enrichments in the desired pattern during manufacture of fuel assemblies for nuclear reactors.

The fuel assemblies in nuclear reactors of the type utilized in power generation generally incorporate numerous fuel rods arranged in spaced-apart relationship in a grid within a frame or "skeleton" including top and bottom nozzles or tie plates between which the fuel rods extend. Each fuel rod generally comprises a stack of enriched fuel pellets within a metal tube sealed by end plugs, which constitute the primary containment boundary of the radioactive nuclear fuel therein. All of the fuel pellets within a given fuel rod are usually of the same enrichment, but fuel rods of the same or different enrichments or multiple enrichments can be used in a particular fuel assembly depending upon the reactor type. For example, a pressurized water reactor (PWR) typically utilizes fuel assemblies with fuel rods of the same enrichment in a particular fuel assembly, while a boiling water reactor (BWR) utilizes fuel assemblies of multiple enrichments which require the fuel rods to be arranged in a particular pattern.

Proper control of the enrichments during construction of the fuel rods and then assembly of the fuel rods into the proper grid locations of the fuel assemblies, is crucial. In addition to the safety considerations involved in handling nuclear fuel, the Nuclear Regulatory Commission (NRC) has established strict quality control standards and performance requirements which must be met to start or continue operation of power reactors. Moreover, nuclear power plants are rated at particular power generation levels which can be difficult to achieve without proper enrichment control during the design, manufacture, and assembly of the fuel assemblies therein. Severe penalties can be incurred by the manufacturer if the power plant fails to generate at the rated capacity. Proper enrichment control during the manufacture of nuclear fuel assemblies is, thus, extremely important, but is complicated by the use of multiple enrichments.

It will be appreciated that proper manufacturing procedures must be implemented and followed, and that provisions must be made for verifying and documenting that fuel rods of the desired enrichments have been loaded into the desired grid locations required by the fuel assemblies.

The actual loading of fuel rods into fuel assemblies has been primarily a manual operation. The fuel rods were transported on a dolly to a position adjacent to an empty fuel assembly lying on its side on another dolly. Referring to a drawing or schematic showing the proper grid locations, the operator would pull out a fuel rod, look at the serial number thereon corresponding to its particular enrichment, compare and match that with the grid location on the schematic, and then insert the rod into the fuel assembly at the desired grid location. Also, before insertion into the fuel assembly, a label bearing the serial number thereof would be removed and applied to a "scroll" as a record of the fuel rods loaded into that fuel assembly. The scrolls would then be turned in periodically for filing or storage to serve as permanent documentation.

This manual based approach, however, is cumbersome at best, subject to operator error or fatigue, and otherwise difficult, particularly with respect to fuel assemblies with fuel rods of different and/or multiple enrichments arranged in a specific pattern. It will be appreciated that under this prior approach, numerous fuel rods and their individual grid locations must be manually identified and then inserted into the correct grid locations, which grids can be up to 17×17 in size, such that operator error and fatigue can be problematical. This prior approach does not provide enough early error detection and feedback to the operator for corrective action while the operator is loading the fuel assembly.

A need has thus arisen for an improved interactive fuel assembly pattern loading system which reduces operator input while providing better verification and documentation of the proper fuel rod loading pattern as the fuel assembly is being assembled.

SUMMARY OF THE INVENTION

The present invention relates to a fuel assembly pattern loading system which overcomes the foregoing and other disadvantages associated with the prior art. The system disclosed and claimed herein is a man/machine interactive system utilizing a computer, a manual scanner, a CRT screen or other display, and a mechanical prompter frame fastened to the end of a fuel assembly loading magazine to assist the assembly operator in loading fuel rods of the proper enrichment into the correct grid locations. The operator reads the identification data on a fuel rod with the scanner. This is inputted into the computer for comparison with stored data relating to the type of fuel assembly to be assembled. A listing of the fuel rod requirements and their grid locations is displayed on the screen for visual reference by the operator. The prompter frame serves to mechanically prompt the operator and/or to detect loading of the fuel rod into the correct grid location of the magazine.

Several embodiments of the prompter frames of different complexities are disclosed. In the preferred embodiment, the frame comprises motorized, slotted perpendicular slides or guide bars controlled by the computer to intersect over the proper grid location for the particular fuel rod so that the fuel rod cannot be loaded into any other grid location. Sensors are provided on the guide bars to automatically confirm that the proper rod has been fully inserted, after which the system waits for the operator to read the next rod before sequencing to the next grid location.

In a second embodiment, the prompter frame comprises a single slotted slide or guide bar which is manually positioned by the operator over the row of the grid containing the correct grid location. Indicators are provided for designation of the proper location of the guide bar and the proper grid location in the exposed row. Sensors are provided for sensing insertion of the fuel rod in the proper grid location.

In a third embodiment, a solid slide or guide bar is mounted for manual positioning by the operator adjacent the row containing the correct grid location for a particular fuel rod. Indicators and sensors are provided for designating proper location of the guide bar and for sensing insertion of the fuel rod into the proper grid location.

In a fourth embodiment, no moveable slide or guide bar is used but sets of offset photosensors are provided on an open rectangular frame mounted on the end of the fuel assembly loading magazine for sensing whether each fuel rod has been inserted into the proper grid location.

BRIEF DESCRIPTION OF THE DRAWINGS

A better understanding of the invention can be had by reference to the following Detailed Description in conjunction with the accompanying Drawings, wherein:

FIGS. 6 A, B, C and D are flowcharts of the control logic utilized by the invention, with the prompter frame of the first embodiment.

DETAILED DESCRIPTION OF THE PREFERRED EMBODIMENTS

Figures 1, 4:
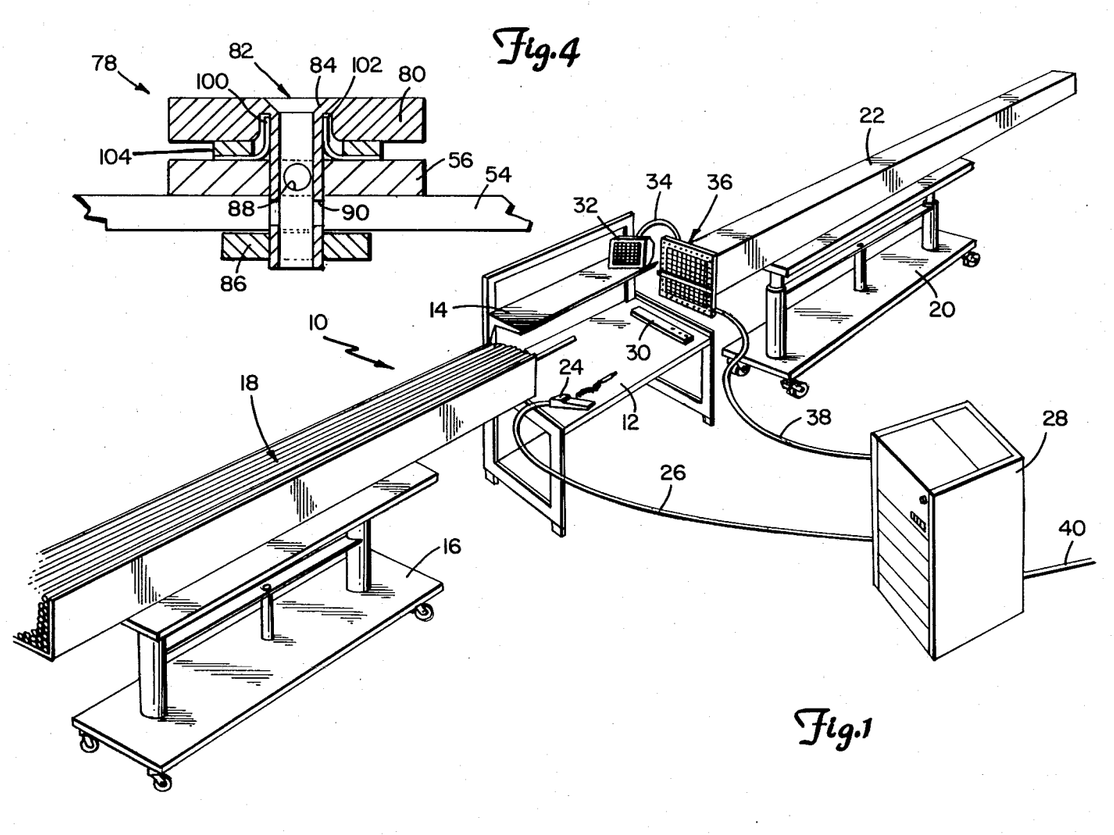
FIG. 1 is an overall perspective view of the pattern fuel assembly loading system of the invention.
FIG. 4 is an enlarged sectional view through the guide bars taken along lines 4—4 of FIG. 2.

Referring now to the Drawings, wherein like reference numerals designate like or corresponding elements throughout the view, and particularly referring to FIG. 1, there is shown the pattern fuel assembly loading system 10 of the invention. The system 10 includes a work station including a table 12 with a shelf 14 located between a dolly 16 containing a supply of fuel roads 18, and another dolly 20 supporting a fuel assembly loading magazine 22. The magazine defines a matrix or grid of cells or locations for the fuel rods of the particular type fuel assembly to be assembled. A hand-held scanner 24 is located on the table 12 for manipulation by the operator. The manual scanner 24, which is preferably of the optical type, is connected by a cable 26 to a computer 28 for processing information read and inputted with the scanner. A scroll 30 is also provided on the table 12 for receiving labels removed by the operator from the fuel rods 18. A CRT screen or display 32 is located on the shelf 14 and is connected via a cable 34 through a prompter frame or rod location and sensing apparatus 36 mounted on the end of the magazine 22, and through another cable 38 to the computer 28. The computer 28, which is programmed with the particular fuel rod loading requirements for the fuel assembly of magazine 22, is preferably connected via cable 40 to a central computer (not shown) for purposes of master storage. As will be explained more fully hereinafter, the system 10 is a computer-based operator prompting system which provides improved control, verification and documentation that the proper fuel rods have been loaded into the correct grid locations.

In general, the system 10 operates as follows. Rods 18 of various types and/or enrichments are placed on the dollies 16 and brought into position at the operator's work station next to the table 12. The operator draws a rod 18 off of the dolly 16 and then reads the information on the removable label or work ticket (not shown) on the rod with the scanner 24, which information is then fed into the computer 28. The fuel rod 18 itself also bears a permanent bar code corresponding at least in part to the information on the work ticket. A facsimile of the grid for the particular fuel assembly of the loading magazine 22 is displayed by computer 28 on the screen 32, with the proper location in the grid for the rod being designated for visual reference by the operator. The operator then inserts the fuel rod 18 through apparatus 36 into the magazine 22 location. In so doing, the rod location and sensing apparatus 36 senses whether the rod has been inserted into the proper grid location and inputs this information to the computer 28 which then waits for identification of the next fuel rod 18 before commencing the next sequence.

As will be explained more fully hereinafter, various embodiments of the rod location and sensing apparatus are disclosed herein having differing degrees of operator prompting and interaction, but all of which detect whether each fuel rod has been inserted into the proper grid location.

Figure 2:
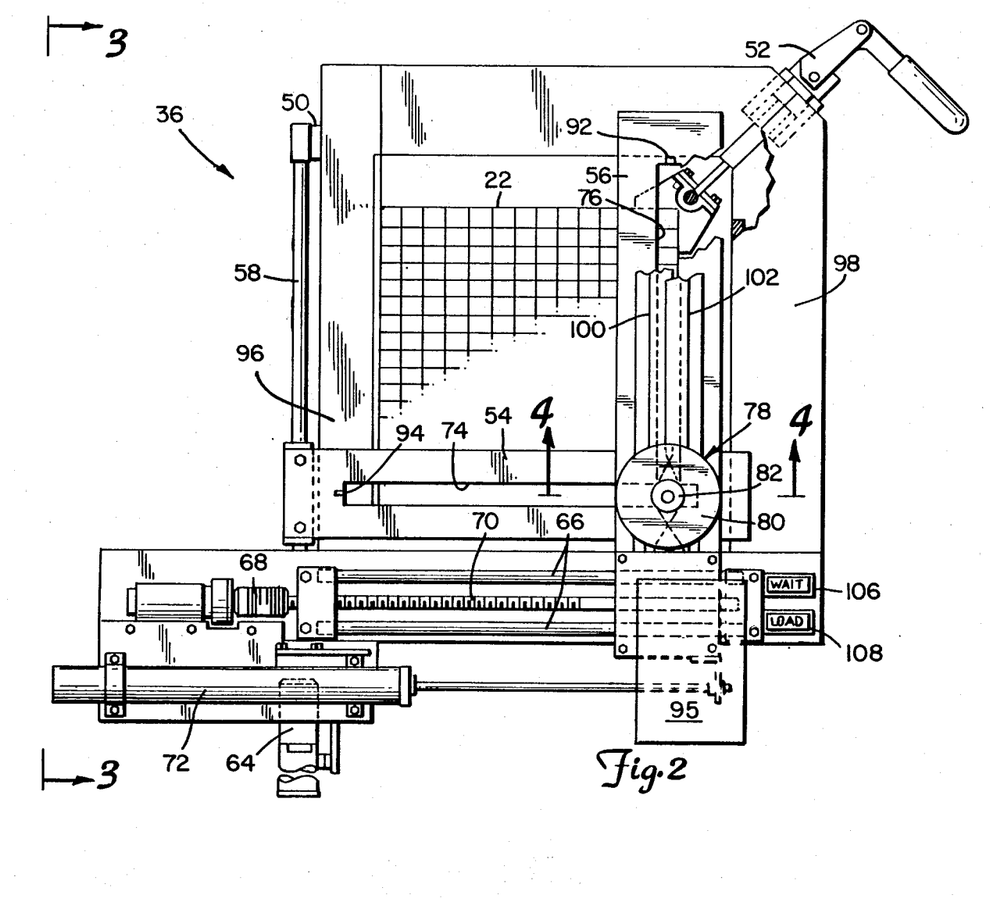
FIG. 2 is a front view of the prompter frame of the first embodiment.
Figure 3:
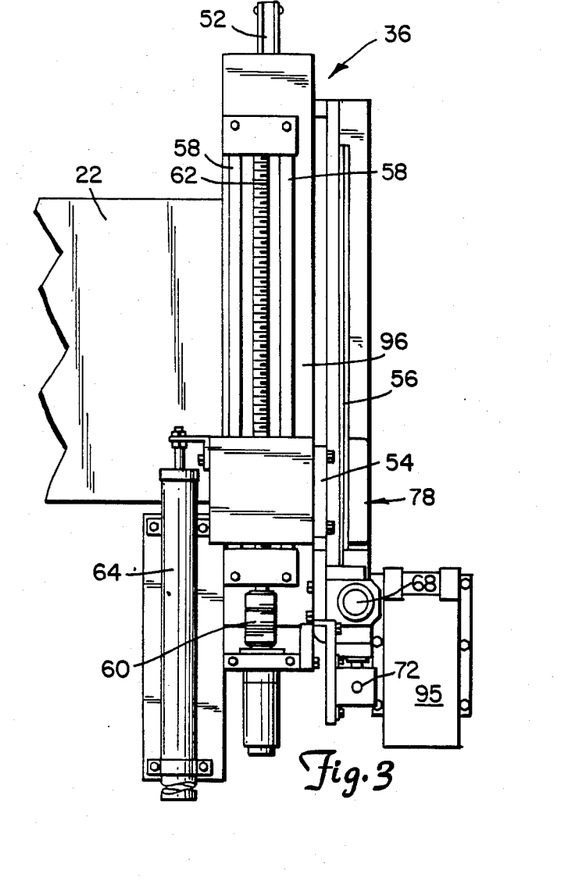
FIG. 3 is a side view taken along lines 3—3 of the prompter frames shown in FIG. 2.

Referring to FIGS. 2 and 3, there is shown the rod location and sensing apparatus 36 of the first embodiment. The apparatus 36 includes a generally rectangular frame 50 adapted for mounting on one end of the fuel assembly loading magazine 22. The frame 50 is adapted for attachment to one end of the magazine 22, preferably by means of some form of suitable releasable attachment since the apparatus 36 can be utilized with magazines of different fuel assemblies. For example, the apparatus 36 can be secured to the end of magazine 22 by means of an over-center clamp 52 as shown. If desired, however, the apparatus can be premanently secured to the magazine 22.

A pair of overlapping, motorized slides or guide bars 54 and 56 are also mounted on the frame 50 of apparatus 36. The guide bars 54 and 56 are preferably arranged perpendicularly. The horizontal guide bar 54 is supported for vertical movement across the end of the magazine 22 on guide rods 58 located on one side of the frame 50. The horizontal guide bar 54 is driven by a gear motor 60 and screw 62 which are controlled by the computer 28. A linear motion position transducer 64 is also connected to the horizontal guide bar 54 for sensing its vertical position for feedback control to computer 28. Similarly, the vertical guide bar 56 is supported on guide rods 66 for movement in a lateral direction across the front of magazine 22. The vertical guide bar 56 is driven by a gear motor 68 and a screw 70 responsive to the computer 28. A linear motion position transducer 72 is also connected to the vertical guide bar 56 for feedback sensing of its position.

The motorized slides or guide bars 54 and 56 include slots 74 and 76, respectively, and are arranged in overlapping relationship so that the slots can intersect over any grid location in the magazine 22 depending upon positioning of the guide bars. In the preferred embodiment, a guide or target 78 is secured between the slides 54 and 56 at the intersection of slots 74 and 76.

The target 78, as is best seen in FIG. 4 consists of an outer plate 80 having a converging central hole 82 registering with a sleeve 84 extending through slots 74 and 76 to a spanner nut 86 located on the opposite side of the horizontal guide bar 54.

The sleeve 84 further includes perpendicular, longitudinally offset through openings 88 and 90 therein for passage of beams from photosensors 92 and 94 associated with guide bars 54 and 56. The photosensors 92 and 94 are of conventional construction, each including opposite corresponding transmitter and reflector portions. The photosensor 92 is located on guide bar 56 at one end of the slot 76 and beams along that slot through opening 88. Similarly, the photo detector sensor 94 is located on the guide bar 54 at the end of slot 74 and projects a beam along the slot through the opening 90.

The beams from the photosensors 92 and 94 operate to detect passage of a fuel rod through the target 78 relative to magazine 22, as well as the direction of passage since the beams are offset and are thus interrupted sequentially depending upon whether the fuel rod is being inserted or withdrawn. Proper insertion first interrupts then clears the beams in the same sequence. Improper insertion of a fuel rod 18, such as partial insertion and withdrawal from magazine 22, does not, signaling error. This comprises an important feature of the invention.

An automatic scanner 95 is preferably mounted on slide 56 beneath target 78 for reading the bar code (not shown) on the fuel rod 18 during insertion, for verification and over-check purposes. The bar code is preferably arranged as a series of rings encircling the fuel rod so that no particular rotational orientation of the rod is necessary for sensing.

In accordance with the preferred construction, the rod location and sensing apparatus 36 further includes a pair of shade rollers 96 and 98 mounted on opposite vertical sides of the frame 50. The rollers 96 and 98 are biased to retracted positions but their free ends are secured to opposite sides of guide bar 56 so as to cover or block out that part of the grid at the end of the magazine 22 other than that exposed by slot 76. Flexible overlapping closure guards 100 and 102 are preferably located along opposite sides of the slot 76 to cover the rest of the grid locations in the end of magazine 22, except the one cell or grid location over which the target 76 is positioned. As is best seen in FIG. 4, the outer edges of the closure guards 100 and 102 are clamped by spacers 104 between the outer plate 80 and slide 56. Slots are defined between plate 80, sleeve 84 and spacer 104 for receiving the deflected free edges of the closure guards 100 and 102 when the target 78 is positioned along slot 76 of the guide bar 56.

More particularly, the system 10 with the rod location and sensing apparatus 36 of the preferred embodiment operates as follows. Referring to FIGS. 6 A, B, C and D, after initialization, the system 10 visually prompts the operator by displaying a message on the screen 32 requesting identification of the fuel assembly to be pre-loaded using magazine 22. This would include, for example, the contract number, assembly type, assembly serial number, and any other information pertinent to the type of fuel assembly to be pre-loaded. The operator then reads this information from the work ticket (not shown) using the scanner 24.

This identifying information is inputted into the computer 28 for verification. A message requesting the operator to wait pending verification, is preferably displayed on the screen 32 while the information is compared with the stored information for particular fuel assemblies, their contract numbers, etc. If the information does not match, the operator is then visually prompted with screen 32 to reenter the information and repeat this step. If a predetermined number, such as three, consecutive misreads occur and there is no verification, then the system 10 programming prompts the operator with a message on the screen 32 to check with his or her supervisor. Possible causes for several consecutive misreads could include equipment malfunction, improper codes, mismatched codes, damaged codes, or assembly information not previously entered into the system 10.

Once the information is verified, the system 10 would then load computer 28 with the particular parameters for the fuel assembly to be pre-loaded. These would include, for example, the assembly grid geometry, tube pitch, fuel rod type requirements, type of fuel rod for each location, etc. While these parameters are being loaded, a message telling the operator to wait pending loading of the assembly parameters would preferably be displayed on the screen 32. After loading, the screen 32 would then display a pictorial representation of the assembly grid, a summary of fuel rod-type usage, the assembly parameters, and a prompting line or message to the operator.

The system 10 would then prompt the operator via screen 32 to input the fuel rod or tube identification. The operator would then pull a fuel rod 18 from the supply dolly 16, read the information on the label thereon (not shown) with the manual scanner 24, and then remove the label from the fuel rod and place it on scroll 30. This information is then compared by the computer 28 with the stored parameters to verify that the particular type of fuel rod 18 which the operator has pulled from the supply dolly 18, is utilized in the particular fuel assembly to be pre-loaded. If not, then an appropriate error message is displayed on the screen 32.

Otherwise, if the fuel rod 18 is of the type which is used on the particular fuel assembly to be preloaded, then control commands are transmitted to the gear motors 60 and 68 so that the guide bars 54 and 56 position the target 78 over an appropriate grid location for that particular fuel rod type. Positioning of the guide bars 54 and 56 is fed back via the transducers 64 and 72 so that the target 78 is precisely positioned as desired. While the target 78 is being positioned, a message is preferably displayed on the screen 32 requesting the operator to wait pending positioning of the guide or target 78.

After the guide bars 54 and 56 of the rod location and sensing apparatus 36 have been positioned, a message is displayed on the screen 32 prompting the operator to load the fuel rod 18 into the designated grid location or cell of the magazine 22. Preferably, the light 108 on the apparatus 36 is also illuminated.

As the fuel rod 18 is being inserted, the bar code thereon is read by the automatic scanner 95 to verify identification of the rod actually being inserted, and the beams of the photosensors 92 and 94 are interrupted in that order so that insertion is sensed. If identification of the fuel rod does not match, the operator is prompted with a message on screen 32 to get another rod. Upon complete insertion of the fuel rod 18, the beams of the photosensors 92 and 94 are cleared, again in the same order, to indicate that the fuel rod has been fully inserted. The designated grid location displayed on the screen 32 preferably turns to a contrasting color while the counts of fuel rods required and installed are decremented and incremented, respectively.

If additional fuel rods 18 of the same type are required, then the system 10 preferably automatically begins positioning the guide bars 54 and 56 to the next required grid location and then prompts the operator via screen 32 to input identification of the next fuel rod. This identifying data is then compared by the computer 28 to verify that the fuel rod 18 is of the same type, and if so, it will then prompt the operator via screen 32 to insert it into the magazine 22 and verify identification by means of scanner 95 and insertion by means of the photosensors 92 and 94.

This routine is repeated until all grid locations for a particular type fuel rod 18 have been properly filled.

If the fuel rod 18 was of the last type required for the particular fuel assembly, the system will prompt the operator with a message on the screen 32 that requirements for this type rod have been met and that he or she should move the next type fuel rod into position from the dolly 16 and read its identifying data by means of the scanner 24. The foregoing routine is repeated for the subject fuel rod type.

This sequence is continued until all fuel rods 18 of each required type have been properly loaded into the magazine 22. When loading is completed, all of the information for the entire pre-loaded assembly is either sent to the central computer (not shown) or stored within the system computer 28 for future downloading. The scroll 30 is also removed for storage.

Figure 5:
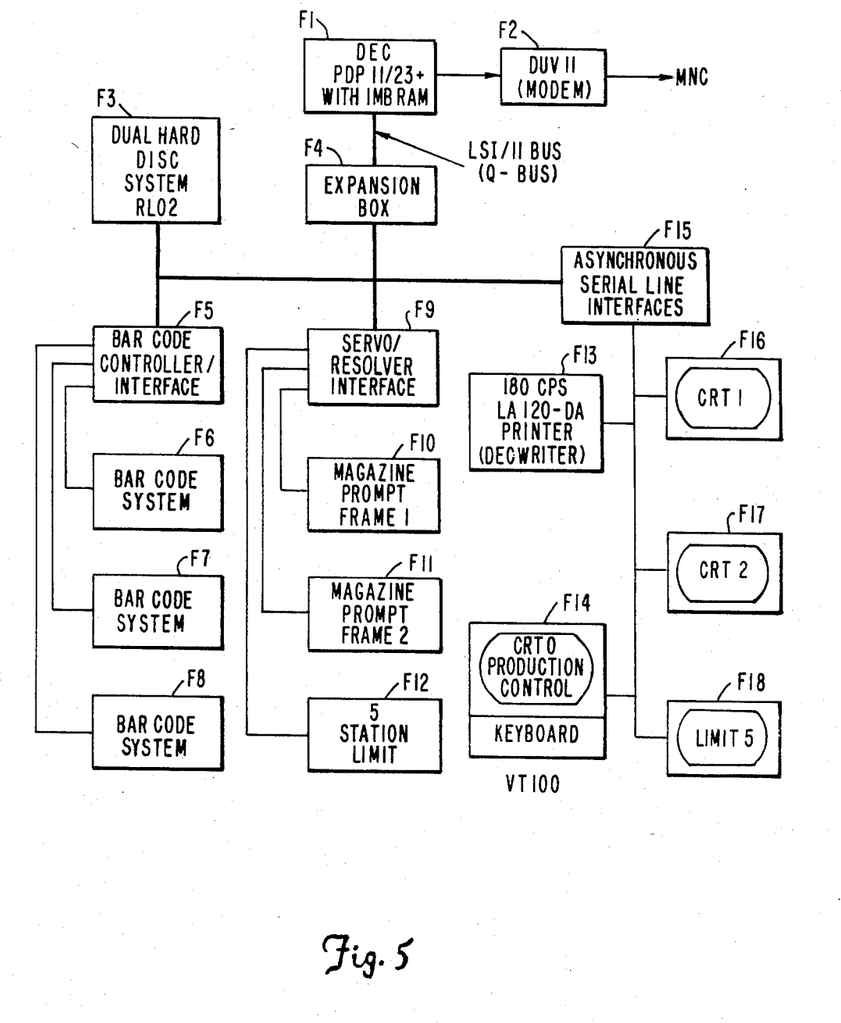
FIG. 5 is a control block diagram of the system herein.
Figure 6A:
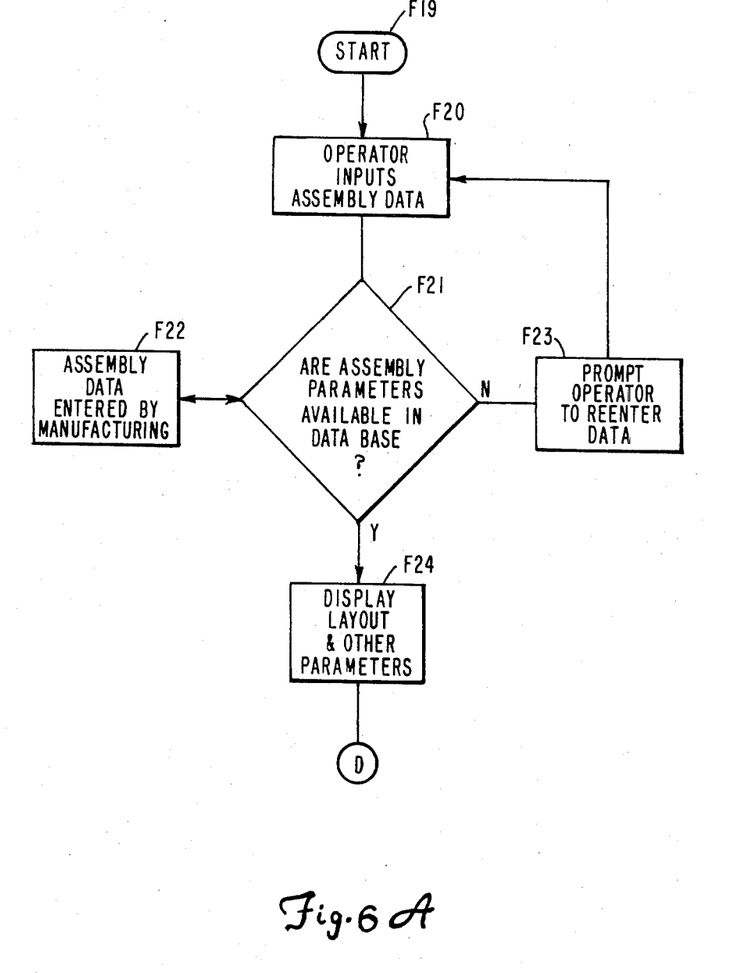
Figure 6B:
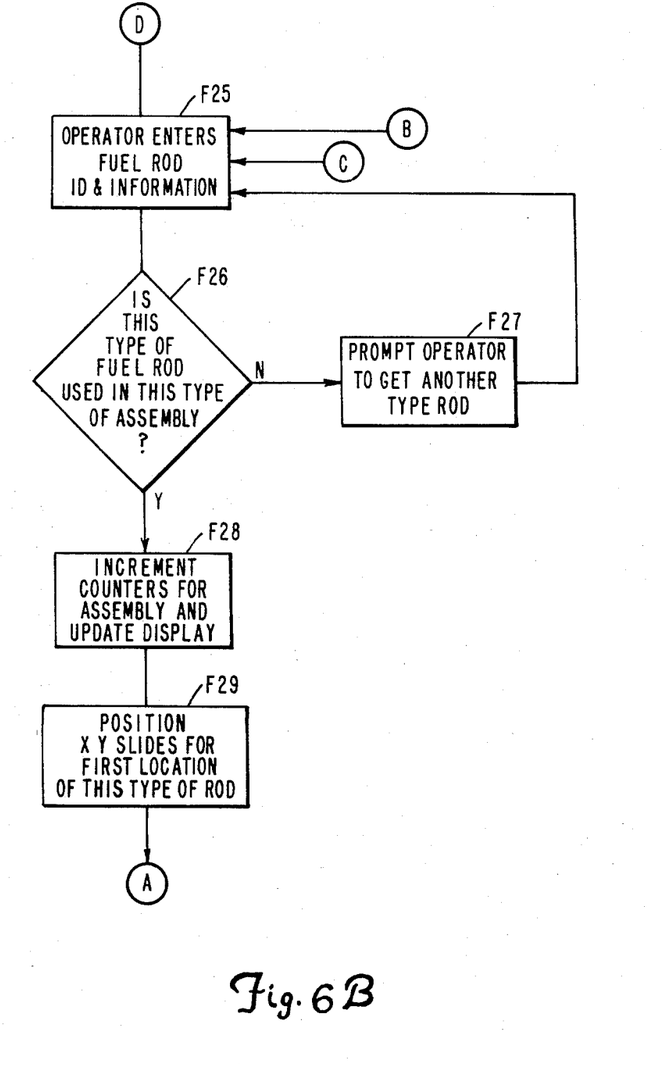
Figure 6C:
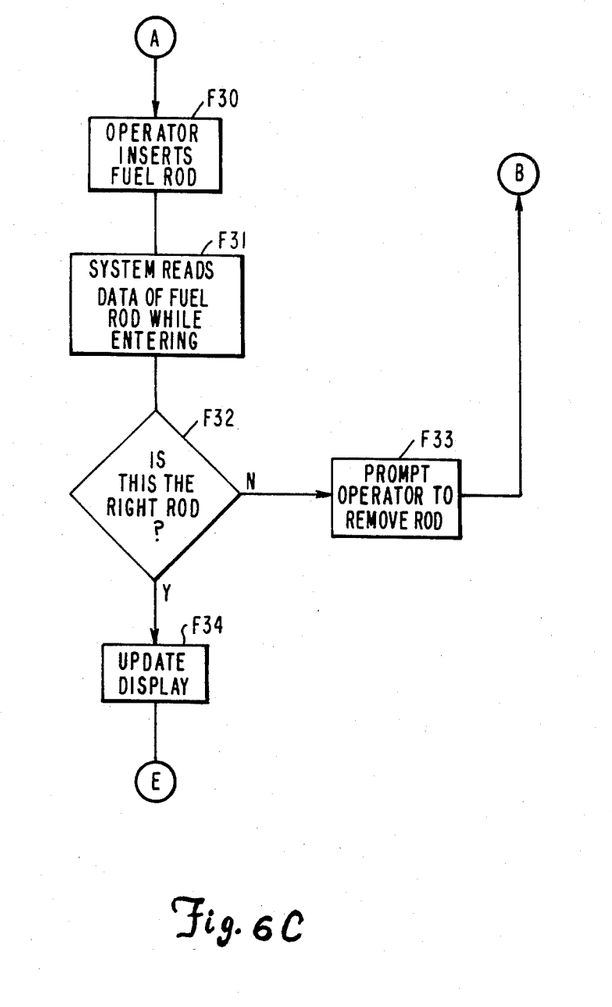
Figure 6D:
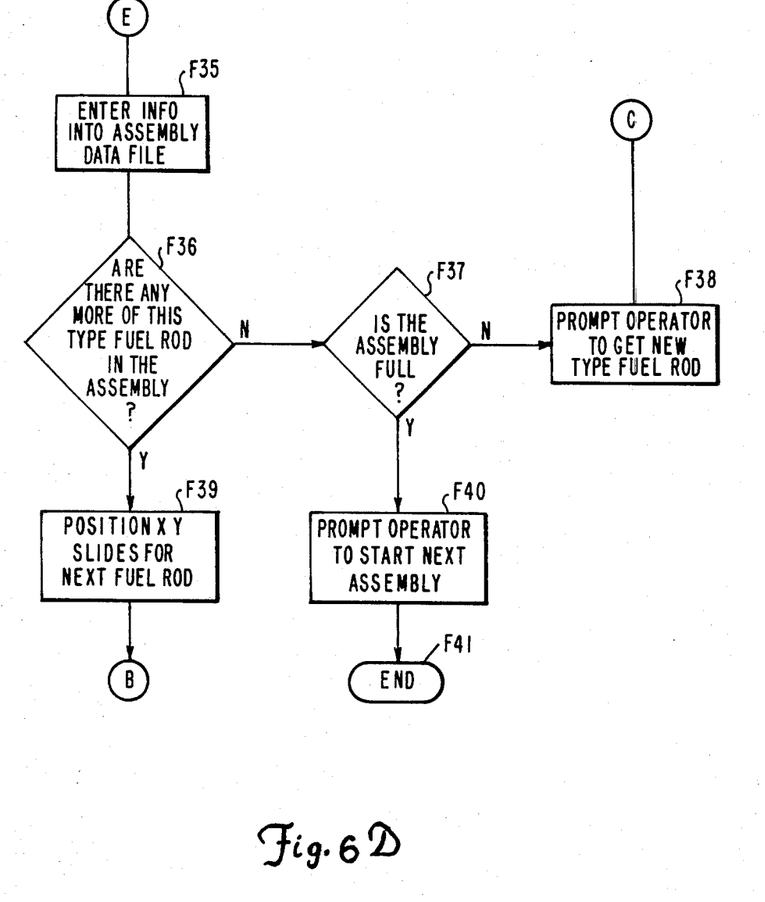

FIG. 5 is a control block diagram for the fuel assembly pattern loading system 10 of the invention. It will be noted that system 10 can be adapted for use with multiple work stations for expansion.

Figure 7:
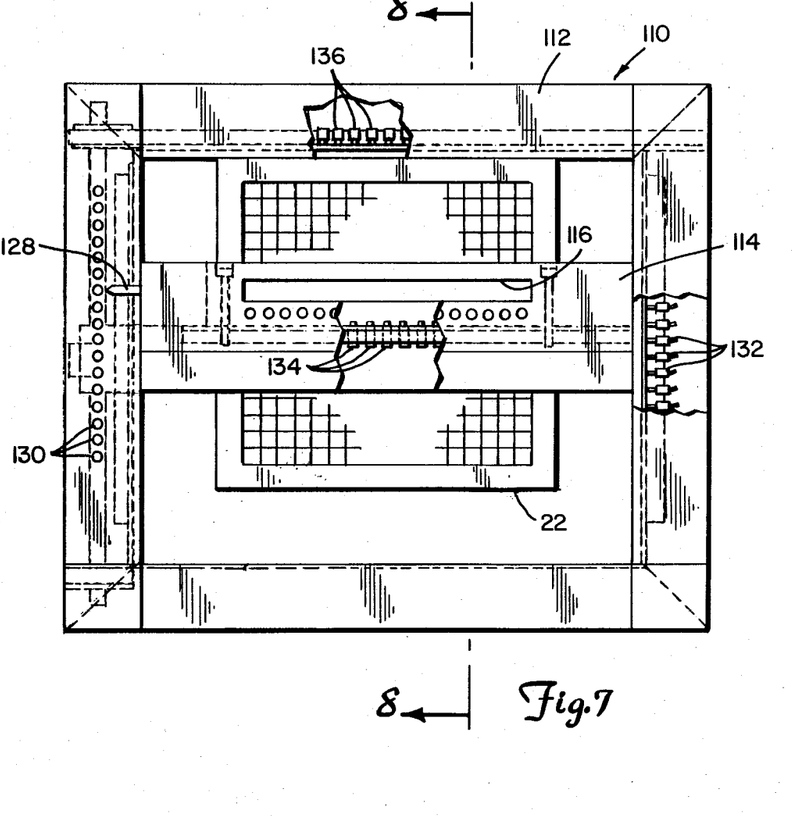
FIG. 7 is a front view of the prompter frame of the second embodiment.
Figure 8:
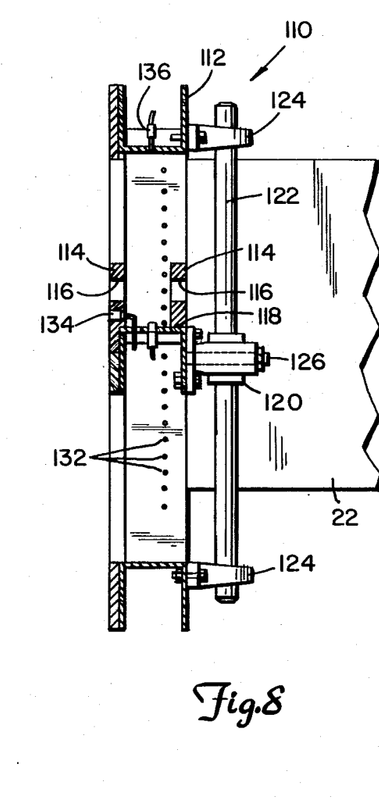
FIG. 8 is a side view taken along lines 8—8 of the prompter frame shown in FIG. 7.

Referring now to FIGS. 7 and 8, there is shown a prompter frame or rod location and sensing apparatus 110 incorporating a second embodiment of the invention. As will be explained more fully hereinafter, the apparatus 110 is also adapted for interaction with a human operator, but is not automatically positioned as is the apparatus 36 of the first embodiment.

The rod location and sensing apparatus 110 includes a generally rectangular frame 112 adapted for mounting on one end of the fuel assembly loading magazine 22. The frame 112 can be constructed from sections of channel-like members secured in end-to-end relationship to define a rectangular opening overlying the magazine 22. The frame 112 can be secured to the magazine 22 by means of a releasable attachment, such as the over-center clamp 52 shown in FIGS. 2 and 3, or it can be secured directly to the loading magazine and thus dedicated to that particular type of magazine.

A pair of superposed guide bars 114 are mounted on the frame 112 for vertical movement. The guide bars 114 are positioned in longitudinally spaced-apart relationship, and each bar includes a horizontal slot 116 therein. A pair of slotted guide bars 114 is preferred to reduce possible skewing of a fuel rod upon insertion, however, a thicker single guide bar would serve the same purpose and is fully equivalent. The guide bars 114 are mounted on a cross member 118 which is supported by slides 120 for movement along vertical rods 122. The guide rods 122 extend between pairs of vertically spaced-apart brackets 124 located on the rear side of the frame 112. Conventional spring-operated detents 126 are provided on the slides 120 for cooperation with holes (not shown) on the frame 112 for releasably locating the guide bars 114 in predetermined vertical positions corresponding to horizontal rows of grid locations in the magazine 22.

A mechanical pointer 128 is secured to the guide bars 114 for cooperation with a column of indicator lights or LEDs 130 provided in the left front side of the frame 112 as shown in FIG. 7. The indicator lights 130 thus serve as prompters to designate the desired row of grid locations or cells in the magazine 22. When one of the indicator lights 130 is illuminated, the operator depresses the detents 126 and moves the guide bars 114 until the pointer 128 points to the illuminated indicator light, thereby positioning the slots 116 over the proper row of cells or grid locations. A set of photosensors 132 are provided along one lateral side of the frame 112, with one photosensor being provided for each row of the grid in the magazine 22. The photosensors 132 are arranged so as to project a beam between the guide bars 114 and along slots 116.

Similarly, a row of indicator lights or LEDs 134 are provided on the front guide bar 114 beneath the slot 116 in positions corresponding to the vertical grid locations or columns of cells in the magazine 22. A corresponding set of photosensors 136 are provided along the top of the frame 112 for projecting beams across the columns of grid locations between the guide bars 114, and in longitudinally-offset relationship to the beams projected by the lateral photosensors 132 so as to sense passage of a fuel rod as well as the direction of passage relative to the guide bars 114.

The indicator lights 134 serve to designate the particular cell within the row of cells designated by slots 116 after manual positioning of the guide bars 114 by the operator responsive to the indicator lights 130. Insertion of a fuel rod into the proper designated cell or grid location will sequentially interrupt the beams from the corresponding photosensors 132 and 136, thereby confirming proper insertion; however, insertion of a fuel rod into any other cell along the designated row will only interrupt the beam of the corresponding horizontal photosensor 132, thereby giving an error signal.

The apparatus 110 is thus semi-manual. Aside from the fact that the rod location and sensing apparatus 110 requires more manual interaction from the operator in terms of vertical positioning of the horizontal guide bars 114 and insertion of the fuel rod into the proper cell of a designated row of cells, instead of automatic positioning of vertical and horizontal guides to designate a single particular cell for receiving the fuel rod, the system 10 operates substantially the same as described hereinbefore in connection with the apparatus 36.

Figure 9:
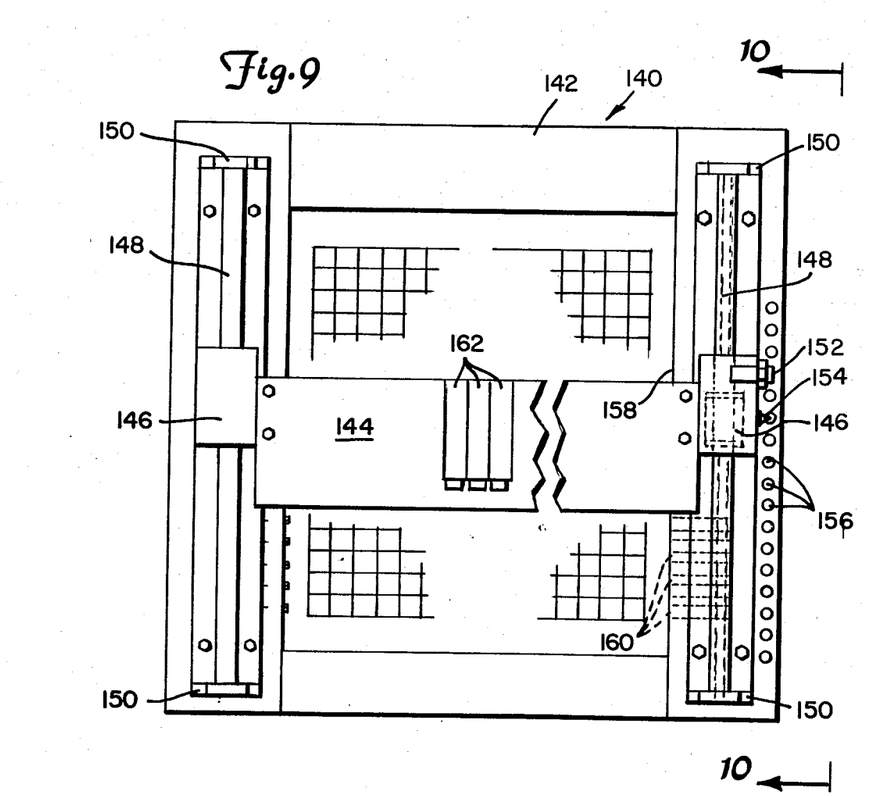
FIG. 9 is a front view of the prompter frame of the third embodiment.
Figure 10:
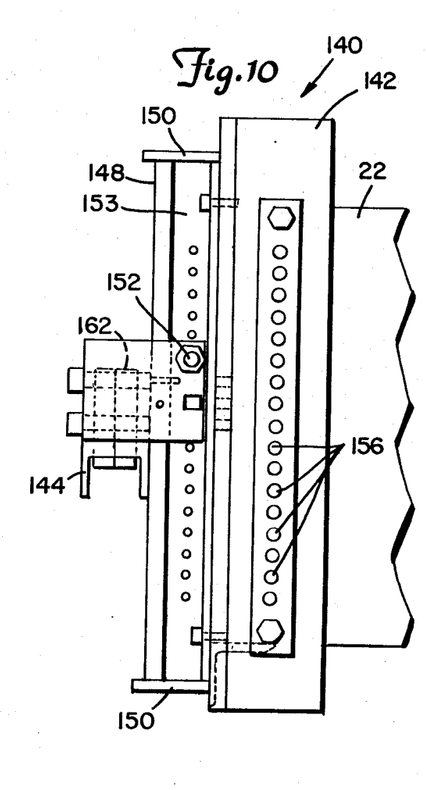
FIG. 10 is a side view taken along lines 10—10 of the prompter frame shown in FIG. 9.

Referring now to FIGS. 9 and 10, there is shown a rod location and sensing apparatus 140 incorporating a third embodiment of the present invention. The apparatus 140 is one step away from the apparatus 110 of the second embodiment, and two steps away from the apparatus 36 of the first embodiment, in that it requires even more manual interaction by the human operator.

In particular, the apparatus 140 includes a generally rectangular frame 142 adapted for attachment to the end of a fuel assembly loading magazine 22. The frame 142 can be releasably secured with a clamp such as clamp 52 shown in FIGS. 2 and 3, or be secured directly to the magazine 22 for which it is adapted and thus dedicated to that type of magazine for use in pre-loading a particular type of fuel assembly.

A single horizontal guide bar 144 is mounted for vertical movement on the frame 142. The guide bar 144 is secured at opposite ends to slides 146 moveable along vertical guide rods 148 secured between spaced-apart brackets 150 on opposite sides of the frame. Conventional spring detents 152 are provided for cooperation with holes in plates 153 for releasably locating the guide bar 144 in any one of a predetermined number of positions corresponding to horizontal rows of grid locations or cells in the magazine 22. A mechanical pointer 154 is also provided on the guide bar 144 for cooperation with a column of indicator lights or LEDs 156 on the frame 142 in similar fashion to the apparatus 110 of the second embodiment.

A tab or flag 158 is also provided on the guide bar 144 at the top edge thereof and adjacent to a portion of the frame 142, for cooperation with a column of spaced-apart proximity sensors 160 therein for sensing proper positioning of the guide with its upper edge positioned immediately adjacent to and beneath the designated row of grid locations. Another set of proximity sensors 162 is located in the upper edge of the guide bar 144 in positions corresponding to the vertical columns of cells for sensing passage of a fuel rod 18 into the magazine 22.

The apparatus 140 of the third embodiment is thus a semi-manual approach requiring the operator first to position the guide bar 144 along the desired row of cells, as indicated by lights 156 and confirmed by sensors 160, and then to insert the fuel rod into the proper cell, as shown on the screen 32 and confirmed by sensors 162. Aside from these differences, the pattern fuel assembly loading system 10 of the invention functions as described hereinbefore, but with more manual intervention when the rod location and sensing apparatus 140 is utilized.

Figure 11:
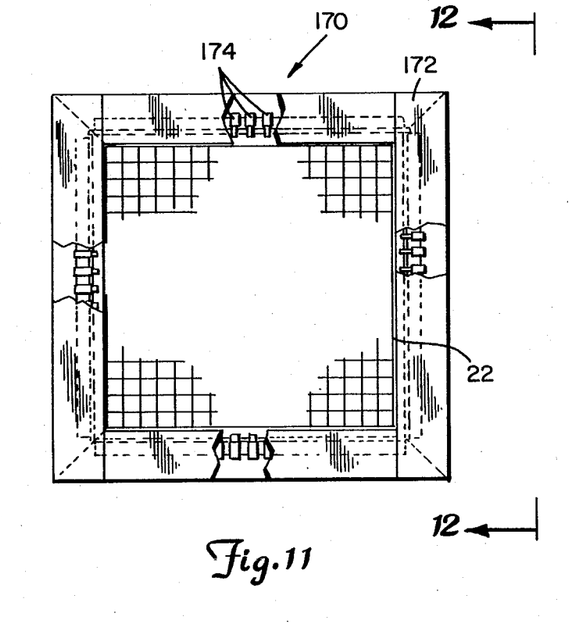
FIG. 11 is a front view of a prompter frame of the third embodiment.
Figure 12:
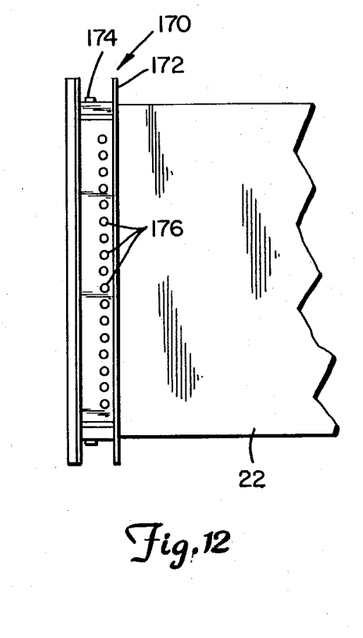
FIG. 12 is a side view of the prompter frame shown in FIG. 11.

Referring now to FIGS. 11 and 12, there is shown a rod location and sensing apparatus 170 incorporating a fourth embodiment of the invention. The apparatus 170 is three steps away from the automatic apparatus 36 of the preferred embodiment, and at least one step away from the semi-manual approaches of the second and third embodiments because there are no horizontal or vertical guide bars for positioning to designate a particular row of grid locations or a particular grid location in that row of the magazine 22.

In particular, the apparatus 170 includes a generally rectangular frame 172 which can be comprised of sections of channel-like members secured in end-to-end relationship. The frame 172 can be releasably secured to the magazine 22 with clamps such as clamp 52 shown in FIGS. 2 and 3, or it can be secured directly to the magazine.

Sets of photosensors 174 and 176 are provided in opposite adjacent sides of the frame 172 in longitudinally-offset relationship corresponding to the columns and rows of grid locations or cells in the magazine 22. No physical prompters in the form of moveable guide bars or indicator lights are utilized. With the apparatus 170, the operator must first refer to the grid location displayed on the screen 32, and then identify and insert the fuel rod 18 into the proper corresponding grid location of the magazine 22. Upon insertion the beams of two particular photosensors 174 and 176 are interrupted to confirm whether the fuel rod 18 has been inserted into the proper grid location. The apparatus 170 is thus relatively straight forward, comprising a frame and two sets of offset crisscrossed photosensors for confirming whether the fuel rod has been inserted into the proper grid location.

From the foregoing, it will thus be apparent that the present invention comprises an improved pattern fuel assembly loading system having numerous advantages over the prior art. The system herein is a computer-based system which enables positive identification of the fuel rods, positive identification of the type of fuel assembly requiring a particular loading pattern or distribution of fuel rods therein, and positive confirmation that the correct fuel rods have been loaded into the proper locations. Although the system herein is computer-based, the degree of human-operator interaction can be adjusted through embodiments of the rod location and sensing apparatus disclosed herein. Other advantages will be evident to those skilled in the art.

Although particular embodiments of the invention have been described in the foregoing Detailed Description and illustrated in the accompanying Drawings, it will be understood that the invention is not limited only to the particular embodiments disclosed, but is intended to embrace any alternatives, equivalents, modifications and/or substitutions of elements falling within the scope of the invention as defined by the following claims.

What is claimed is:

1. An interactive system for facilitating preloading of fuel rods into magazines, which comprises:
   an operator work station adapted for positioning between a supply of fuel rods of predetermined types, and the magazine defining grid locations for a predetermined fuel assembly;
   display means associated with said work station;
   scanner means associated with said work station and adapted for reading predetermined information accompanying the fuel rods;
   a rectangular frame adapted for attachment to one end of the fuel assembly loading magazine;
   prompter/detector means associated with said frame for detecting insertion of a fuel rod into the magazine; and
   processing means responsive to said scanner means and said sensing means for prompting the operator via said display means to pre-load the fuel rods into desired grid locations in the magazine.

2. The system of claim 1, wherein said display means comprises a CRT screen mounted on said work station.

3. The system of claim 1, wherein said scanner means comprises a hand-held optical character reader.

4. The system of claim 1, wherein said prompter/detector means comprises:
   a pair of guide bars mounted for movement in generally perpendicular directions across said frame, said guide bars being superposed and including elongate slots therein that intersect to define a passage for guiding a fuel rod into the magazine;
   first sensor means associated with the slot of each guide bar for detecting passage of a fuel rod therethrough;
   drive means for effecting movement of each guide bar;
   second sensor means for detecting positioning of each guide bar; and
   said processing means being coupled to said drive means and further responsive to said first and second sensor means for controlling positioning of said guide bars.

5. The system of claim 1, wherein said prompter/detector means comprises:
- a guide bar mounted for movement across said frame, said guide bar including an elongate slot therein;
- detent means for releasably manually positioning the slot of said guide bar over a selective group of grid locations in the magazine;
- a plurality of first indicator lights on said guide bar corresponding to each column of grid locations in the magazine;
- a plurality of second indicator lights on said frame corresponding to each row of grid locations in the magazine;
- a mechanical pointer secured to said guide bar and associated with said second indicator lights; and
- first and second generally perpendicular, offset sensor means for detecting passage of a fuel rod through the slot of said guide bar into the magazine.

6. The system of claim 1, wherein said prompter/detector means comprises:
- a guide bar mounted for movement across said frame;
- detent means for releasably manually positioning said guide bar adjacent to selective rows of grid locations in the magazine;
- a plurality of indicator lights on said frame corresponding to rows of grid locations in the magazine;
- a mechanical pointer secured to said guide bar and associated with said indicator lights;
- a plurality of first proximity switches associated with said frame for detecting positioning of said guide bar relative to the rows of grid locations in the magazine; and
- a plurality of second proximity sensors associated with said guide bar for detecting insertion of a fuel rod into one of the grid locations adjacent to said guide bar.

7. The system of claim 1, wherein said prompter/detector means comprises:
- a plurality of first photosensors associated with one side of said frame and corresponding to the rows of grid locations in the magazine; and
- a plurality of second photosensors associated with an adjacent side of said frame and corresponding to columns of grid locations in the magazine, said first and second photosensors being offset for detecting movement of a fuel rod relative to the magazine.

8. The system of claim 1, further including:
- a scroll associated with said work station for manually receiving documentation associated with the fuel rods as a record of the fuel rods loaded into the magazine.

9. An interactive system for facilitating preloading of fuel rods into magazines, which comprises:
- an operator work station adapted for positioning between a supply of fuel rods of predetermined types, and the magazine defining grid locations for a predetermined fuel assembly;
- display means associated with said work station;
- scanner means associated with said work station and adapted for reading predetermined information accompanying the fuel rods;
- a rectangular frame adapted for attachment to one end of the fuel assembly loading magazine;
- a pair of guide bars mounted for movement in generally perpendicular directions across said frame, said guide bars being superposed and including elongate slots therein that intersect to define a passage for guiding a fuel rod into a single grid location of the magazine;
- first sensor means associated with the slot of each guide bar for detecting passage of a fuel rod therethrough;
- drive means for effecting movement of each guide bar;
- second sensor means for detecting positioning of each guide bar; and
- processing means responsive to said scanner means and said sensing means for prompting the operator via said display means to pre-load the fuel rods into predetermined grid locations of the magazine, said processing means being coupled to said drive means and further responsive to said first and second sensor means for controlling positioning of said guide bars.

10. The system of claim 9, wherein said display means comprises a CRT screen mounted on said work station.

11. The system of claim 9, wherein said scanner means comprises a hand-held optical character reader.

12. The system of claim 9, further including:
- a scroll associated with said work station for manually receiving documentation associated with the fuel rods as a record of the fuel rods loaded into the magazine.

13. The system of claim 9, further including:
- means for releasably securing said frame to the magazine.

14. The system of claim 9, further including:
- target means secured between said guide bars at the intersection of the slots therein for receiving and guiding a fuel rod into the adjacent grid location of the magazine;
- second scanner means associated with said target means for automatically reading predetermined information on the fuel rod upon insertion into the magazine;
- retractable shade means associated with one of said guide bars for movement therewith to cover the grid locations of the magazine not covered by said guide bars; and
- resilient flap means provided in the slot of the one said guide bar for covering the rest of the cells so that the fuel rod can be inserted only into the grid locations adjacent said target means.

15. An interactive system for facilitating preloading of fuel rods into magazines, which comprises:
- an operator work station adapted for positioning between a supply of fuel rods of predetermined types, and the magazine defining grid locations for a predetermined fuel assembly;
- display means associated with said work station;
- scanner means associated with said work station and adapted for reading predetermined information accompanying the fuel rods;
- a rectangular frame adapted for attachment to one end of the fuel assembly loading magazine;
- a guide bar mounted for movement across said frame, said guide bar including an elongate slot therein;
- detent means for selectively manually positioning the slot of said guide bar over a predetermined group of grid locations in the magazine;
- a plurality of first indicator lights on said guide bar corresponding to each column of grid locations in the magazine;

a plurality of second indicator lights on said frame corresponding to each row of grid locations in the magazine;

a mechanical pointer secured to said guide bar and associated with said second indicator lights;

first and second generally perpendicular, offset sensor means for detecting passage of a fuel rod through the slot of said guide bar into the magazine; and processing means responsive to said scanner means and said first and second sensor means for prompting the operator via said display means to preload the fuel rods into predetermined grid locations of the magazine.

16. An interactive system for facilitating preloading of fuel rods into magazines, which comprises:

an operator work station adapted for positioning between a supply of fuel rods of predetermined types, and the magazine defining grid locations for a predetermined fuel assembly;

display means associated with said work station;

scanner means associated with said work station and adapted for reading predetermined information accompanying the fuel rods;

a rectangular frame adapted for attachment to one end of the fuel assembly loading magazine;

a guide bar mounted for movement across said frame;

detent means for releasably manually positioning said guide bar adjacent to groups of grid locations in the magazine;

a plurality of indicator lights on said frame corresponding to the groups of grid locations in the magazine;

a mechanical pointer secured to said guide bar and associated with said indicator lights;

a plurality of first proximity switches associated with said frame for detecting positioning of said guide bar relative to the groups of grid locations in the magazine;

a plurality of second proximity sensors associated with said guide bar for detecting insertion of a fuel rod into one of the grid locations adjacent to said guide bar; and processing means responsive to said scanner means and said first and second proximity switches for prompting the operator via said display means to preload the fuel rods into predetermined grid locations of the magazine.

17. An interactive system for facilitating preloading of fuel rods into magazines, which comprises:

an operator work station adapted for positioning between a supply of fuel rods of predetermined types, and the magazine defining grid locations for a predetermined fuel assembly;

display means associated with said work station;

scanner means associated with said work station and adapted for reading predetermined information accompanying the fuel rods;

a rectangular frame adapted for attachment to one end of the fuel assembly loading magazine;

a plurality of first photosensors associated with one side of said frame and corresponding to the rows of grid locations in the magazine;

a plurality of second photosensors associated with an adjacent side of said frame and corresponding to columns of grid locations in the magazine, said first and second photosensors being offset for detecting movement of a fuel rod relative to the magazine; and processing means responsive to said scanner means and said sensing means for prompting the operator via said display means to pre-load the fuel rods into predetermined grid locations of the magazine.

18. Apparatus for facilitating pre-loading of fuel rods in predetermined grid locations of a fuel assembly loading magazine, comprising:

a rectangular frame adapted for attachment to one end of the fuel assembly loading magazine; and means associated with said frame for detecting insertion of fuel rods into the magazine.

19. The apparatus of claim 18, wherein said detection means comprises:

a pair of guide bars mounted for movement in generally perpendicular directions across said frame, said guide bars being superposed and including elongate slots therein that intersect to define a passage for guiding a fuel rod into a predetermined grid location of the magazine;

first sensor means associated with the slot of each guide bar for detecting passage of a fuel rod therethrough;

drive means for effecting movement of each guide bar;

second sensor means for detecting positioning of each guide bar; and processing means coupled to said drive means and further responsive to said first and second sensor means for controlling positioning of said guide bars.

20. The system of claim 18, wherein said detection means comprises:

a guide bar mounted for movement across said frame, said guide bar including an elongate slot therein;

detent means for releasably manually positioning the slot of said guide bar over a selective row of grid locations in the magazine;

a plurality of first indicator lights on said guide bar corresponding to each column of grid locations in the magazine;

a plurality of second indicator lights on said frame corresponding to each row of grid locations in the magazine;

mechanical pointer secured to said guide bar and associated with said second indicator lights; and first and second generally perpendicular, offset sensor means for detecting passage of a fuel rod through the slot of said guide bar into the magazine.

21. The apparatus of claim 18, wherein said detection means comprises:

a guide bar mounted for movement across said frame;

detent means for releasably manually positioning said guide bar adjacent to selective rows of grid locations in the magazine;

a plurality of indicator lights on said frame corresponding to rows of grid locations in the magazine;

a mechanical pointer secured to said guide bar and associated with said indicator lights;

a plurality of first proximity switches associated with said frame for detecting positioning of said guide bar relative to the rows of grid locations in the magazine; and a plurality of second proximity sensors associated with said guide bar for detecting insertion of a fuel rod into one of the grid locations adjacent to said guide bar.

22. The apparatus of claim 18, wherein said detection means comprises:
   a plurality of first photosensors associated with one side of said frame and corresponding to the rows of grid locations in the magazine; and
   a plurality of second photosensors associated with an adjacent side of said frame and corresponding to columns of grid locations in the magazine, said first and second photosensors being offset for detecting movement of a fuel rod relative to the magazine.

23. Apparatus for facilitating pre-loading of fuel rods in predetermined grid locations of a fuel assembly loading magazine, comprising:
   a rectangular frame adapted for attachment to one end of the fuel assembly loading magazine;
   a pair of guide bars mounted for movement in generally perpendicular directions across said frame, said guide bars being superposed and including elongate slots therein that intersect to define a passage for guiding a fuel rod into a predetermined grid location of the magazine;
   first sensor means associated with the slot of each guide bar for detecting passage of a fuel rod therethrough;
   drive means for effecting movement of each guide bar;
   second sensor means for detecting positioning of each guide bar; and
   processing means coupled to said drive means responsive to said first and second sensor means for controlling positioning of said guide bars.

24. The apparatus of claim 23, further including:
   means for releasably securing said frame to the magazine.

25. The apparatus of claim 23, further including:
   target means secured between said guide bars at the intersection of the slots therein for receiving and guiding a fuel rod into the adjacent cell of the magazine;
   retractable shade means associated with one of said guide bars for movement therewith to cover the grid locations of the magazine not covered by said guide bars; and
   resilient flap means provided in the slot of the one said guide bar for covering the rest of the grid locations so that the fuel rod can be inserted only into the grid locations adjacent said target means.

26. Apparatus for facilitating pre-loading of fuel rods in predetermined grid locations of a fuel assembly loading magazine, comprising:
   a rectangular frame adapted for attachment to one end of the fuel assembly loading magazine;
   a guide bar mounted for movement across said frame, said guide bar including an elongate slot therein;
   detent means for releasably manually positioning the slot of said guide bar over selective rows of grid locations in the magazine;
   a plurality of first indicator lights on said guide bar corresponding to each column of grid locations in the magazine;
   a plurality of second indicator lights on said frame corresponding to each row of grid locations in the magazine;
   a mechanical pointer secured to said guide bar and associated with said second indicator lights; and
   first and second generally perpendicular, offset sensor means for detecting passage of a fuel rod through the slot of said guide bar into the magazine.

27. Apparatus for facilitating pre-loading of fuel rods in predetermined grid locations of a fuel assembly loading magazine, comprising:
   a rectangular frame adapted for attachment to one end of the fuel assembly loading magazine;
   a guide bar mounted for movement across said frame;
   detent means for releasably manually positioning said guide bar adjacent to selective rows of grid locations in the magazine;
   a plurality of indicator lights on said frame corresponding to rows of grid locations in the magazine;
   a mechanical pointer secured to said guide bar and associated with said indicator lights;
   a plurality of first proximity switches associated with said frame for detecting positioning of said guide bar relative to the rows of grid locations in the magazine; and
   a plurality of second proximity sensors associated with said guide bar for detecting insertion of a fuel rod into one of the grid locations adjacent to said guide bar.

28. Apparatus for facilitating pre-loading of fuel rods in predetermined grid locations of a fuel assembly loading magazine, comprising:
   a rectangular frame adapted for attachment to one end of the fuel assembly loading magazine;
   a plurality of first photosensors associated with one side of said frame and corresponding to the rows of grid locations in the magazine; and
   a plurality of second photosensors associated with an adjacent side of said frame and corresponding to columns of grid locations in the magazine, said first and second photosensors being offset for detecting movement of a fuel rod relative to the magazine.

* * * * *